(12) United States Patent
Brown et al.

(10) Patent No.: US 6,950,623 B2
(45) Date of Patent: Sep. 27, 2005

(54) METHODS AND SYSTEMS FOR DYNAMICALLY SERVING IN-STREAM ADVERTISEMENTS

(75) Inventors: Jon W. Brown, Kent, WA (US); Frank Kemery, Seattle, WA (US)

(73) Assignee: Loudeye Corporation, Seattle, WA (US)

( * ) Notice: Subject to any disclaimer, the term of this patent is extended or adjusted under 35 U.S.C. 154(b) by 505 days.

(21) Appl. No.: 09/955,750

(22) Filed: Sep. 18, 2001

(65) Prior Publication Data

US 2002/0068525 A1 Jun. 6, 2002

Related U.S. Application Data

(60) Provisional application No. 60/234,046, filed on Sep. 19, 2000, and provisional application No. 60/233,513, filed on Sep. 19, 2000.

(51) Int. Cl.[7] .............................................. H04H 1/00
(52) U.S. Cl. ................... 455/3.01; 455/414.1; 455/418; 705/42

(58) Field of Search ............................. 455/3.01, 414.1, 455/418; 709/217, 206; 705/219, 26; 725/34, 35, 87, 42

(56) References Cited

U.S. PATENT DOCUMENTS 6,507,764 B1 * 1/2003 Parrella et al. ............... 700/94
6,698,020 B1 * 2/2004 Zigmond et al. ............. 725/34

* cited by examiner

Primary Examiner—Melur Ramakrishnaiah
(74) Attorney, Agent, or Firm—Pillsbury Winthrop Shaw Pittman LLP

(57) ABSTRACT

Computer-based methods and systems for dynamically inserting advertising content into a radio broadcast are provided. Example embodiments provide a Streaming Content System that comprises one or more media servers, an ad content repository, a broadcast throughput channel, an enhanced media encoder interface, and an ad server interface. These components cooperated to request ads that are targeted according to passed personalization data. The ads are inserted dynamically into a stream of audio or video content upon detection of an ad event. To control playback delays, the ads are preferably buffered ahead of their need.

16 Claims, 11 Drawing Sheets

```
<ASX version="3.0">
    <title>Dynamic Ad Insertion Demo</title>
    <ENTRY>
        <REF HREF="mms://wmr01sea.activate.net/rcs"/>
    <ENTRY>
</ASX>
```

*Fig. 6A*

```
<ASX version="3.0">
        <title>Dynamic Ad Insertion Demo</title>
        <ENTRY>
                <REF HREF="mms://wmr01sea.activate.net/rcs"/>
        <ENTRY>

<!-- NOTE: This ASX file only inserts 30 second ads.
It would be possible to insert ads of other lenghts as well.
For example, the name of another 90 second Event tag may be "60,30"
-->
```

```
<!--60 Second Events-->                              6B03
        <EVENT NAME="30,30" WHENDONE="RESUME">
              <ENTRY CLIENTSKIP="NO">
                <REF
HREF=http://64.85.69.243.98/tserver/site=siteone/area=rcs/size=30_SEC_AUDIO_16K/>   6B05
                </ENTRY>
              <ENTRY CLIENTSKIP="NO">
                <REF
HREF=http://64.85.69.243.98/tserver/site=siteone/area=rcs/size=30_SEC_AUDIO_16K/>   6B05
                </ENTRY>
           </EVENT>
                       6B04
```
6B01

```
<!--90 Second Events-->
        <EVENT NAME="30,30,30" WHENDONE="RESUME">
              <ENTRY CLIENTSKIP="NO">
                <REF
HREF=http://64.85.69.243.98/tserver/site=siteone/area=rcs/size=30_SEC_AUDIO_16K/>
                </ENTRY>
              <ENTRY CLIENTSKIP="NO">
                <REF
HREF=http://64.85.69.243.98/tserver/site=siteone/area=rcs/size=30_SEC_AUDIO_16K/>
                </ENTRY>
              <ENTRY CLIENTSKIP="NO">
                <REF
HREF=http://64.85.69.243.98/tserver/site=siteone/area=rcs/size=30_SEC_AUDIO_16K/>
                </ENTRY>
           </EVENT>
```
6B02

```
</ASX>
```

*Fig. 6B*

METHODS AND SYSTEMS FOR DYNAMICALLY SERVING IN-STREAM ADVERTISEMENTS

CROSS-REFERENCE TO RELATED APPLICATION

This application claims the benefit of U.S. Provisional Patent Application No. 60/234,046 filed on Sep. 19, 2000, and U.S. Provisional Patent Application No. 60/233,513 filed on Sep. 19, 2000, which are incorporated herein by reference in their entirety.

BACKGROUND OF THE INVENTION

1. Field of the Invention

The present invention relates to a method and system for inserting advertisements into streaming digital media and, in particular, to methods and systems for inserting and playing back individualized advertisements from within the same radio stream.

2. Description of the Related Art

Traditional radio broadcasting facilities earn money by selling advertisements (ads) that are played back at specified times to an unknown and typically not well-tracked audience. These periods are often referred to as ad breaks. A broadcast operator typically presses a switch at a console for each ad break. Every audience member hears the same ad, with a smooth transition into and out of each ad.

The Internet, digital streaming technologies, and other related on-line technologies have changed the audience listening horizon in that it is now possible to listen to a radio broadcast over a network. This is referred to as a "live connection." The content is "streamed" in real time to a client computer system for playback, such as using a media player software program. It is also possible to listen to a previously recorded broadcast as "on-demand" content. Such a computer system that serves digital content can now track many types of data to characterize an audience member, for example age and gender. Unlike for the traditional radio broadcast studio, the audience member is no longer anonymous.

Today, advertisements in a digital radio broadcast are essentially served as pre-programmed items in the broadcast stream. For example, a studio that wishes to play local ads typically replaces the existing ads (as with traditional sound mixing techniques) with the desired ads prior to the content being delivered to the client listeners. In a sense, these techniques for inserting ads into streamed radio broadcasts are similar to how software applications are "localized" for different languages.

SUMMARY OF THE INVENTION

Embodiments of the present invention provide methods and systems for dynamically inserting individualized (or personalized) ads into a digital radio broadcast stream. Example embodiments provide an Enhanced Media Encoder on the radio station end and a Streaming Content System that works with existing third-party ad servers and media players to deliver personalized ads to audience listeners of a particular broadcast. Using techniques of the present invention, two or more media players can be playing back the same radio broadcast using a live connection but with vastly different ads inserted in marked (tagged) positions in the broadcast stream. This capability enables a broadcast studio to sell to companies ad spots that are targeted to particular audiences, thus increasing the potential value of each ad, and presumably the revenue of the radio station.

The Streaming Content System preferably is positioned between the radio station and the audience listener and manages the flow between the client media player and the third-party ad server to obtain appropriate ads for the circumstance. In one embodiment, the Streaming Content System ("SCS") provides one or more media player servers, an ad content repository, a broadcast stream throughput channel, an interface to the enhanced media encoder and an interface to an ad server. In some cases, the media player servers include a Windows Media Player Server for interfacing to a Windows media player. When a media player requests a broadcast from a particular station, the SCS obtains from the enhanced media encoder of the radio station the broadcast stream, which includes additional information such as tags to be used for inserting ad content. The SCS streams the content to the media player. When the media player detects that at least one ad event is needed, the player sends an ad request optionally with personalization information to the SCS, which is forwarded for filling to the ad server. The ad server returns to the media player an indicator of the ads to insert. The media player can then request these ads and buffer them until such a time as they are needed. As the broadcast stream continues to play, the media player will encounter ad events. In response to each ad event, the media player will effectively switch to streaming the appropriate ad instead of the broadcast. When the ad has finished playing, the media player resumes streaming the broadcast. In one embodiment, the SCS and media players cooperate to perform the switching in a manner that minimizes dead air space.

In one embodiment, the switching is accomplished by simultaneously streaming the radio broadcast and the ad using two instantiated media players and turning down the volume of one of the instantiated media players to effectively minimize the dead air space. In another embodiment, the switching is accomplished through one instantiated media player by terminating the broadcast stream and beginning to play the buffered ad stream, and then buffering and playing the broadcast stream again when the media player determines that the ad stream is to be terminated.

In another embodiment, the SCS pushes ad content to the media players instead of the media players pulling the ad content when needed. Accordingly, the SCS performs the ad event detection and stream switching related tasks.

In one embodiment, banner ads as well as audio ads are served and inserted into radio broadcasts. In yet another embodiment, video ads or banner ads are served and inserted into the radio broadcasts. In yet another embodiment, video content is streamed and audio ads are served and inserted into the video streams. In another embodiment, video ads or banner ads are served and inserted into video streams.

BRIEF DESCRIPTION OF THE DRAWINGS

FIG. 6A is example ASX script code indicating an ad block and an ad stream source.

FIG. 6B is example ASX script code indicating three ad blocks.

DETAILED DESCRIPTION OF THE INVENTION

Embodiments of the present invention provide computer-based methods and systems for dynamically serving in-stream advertisements.

Figure 1:
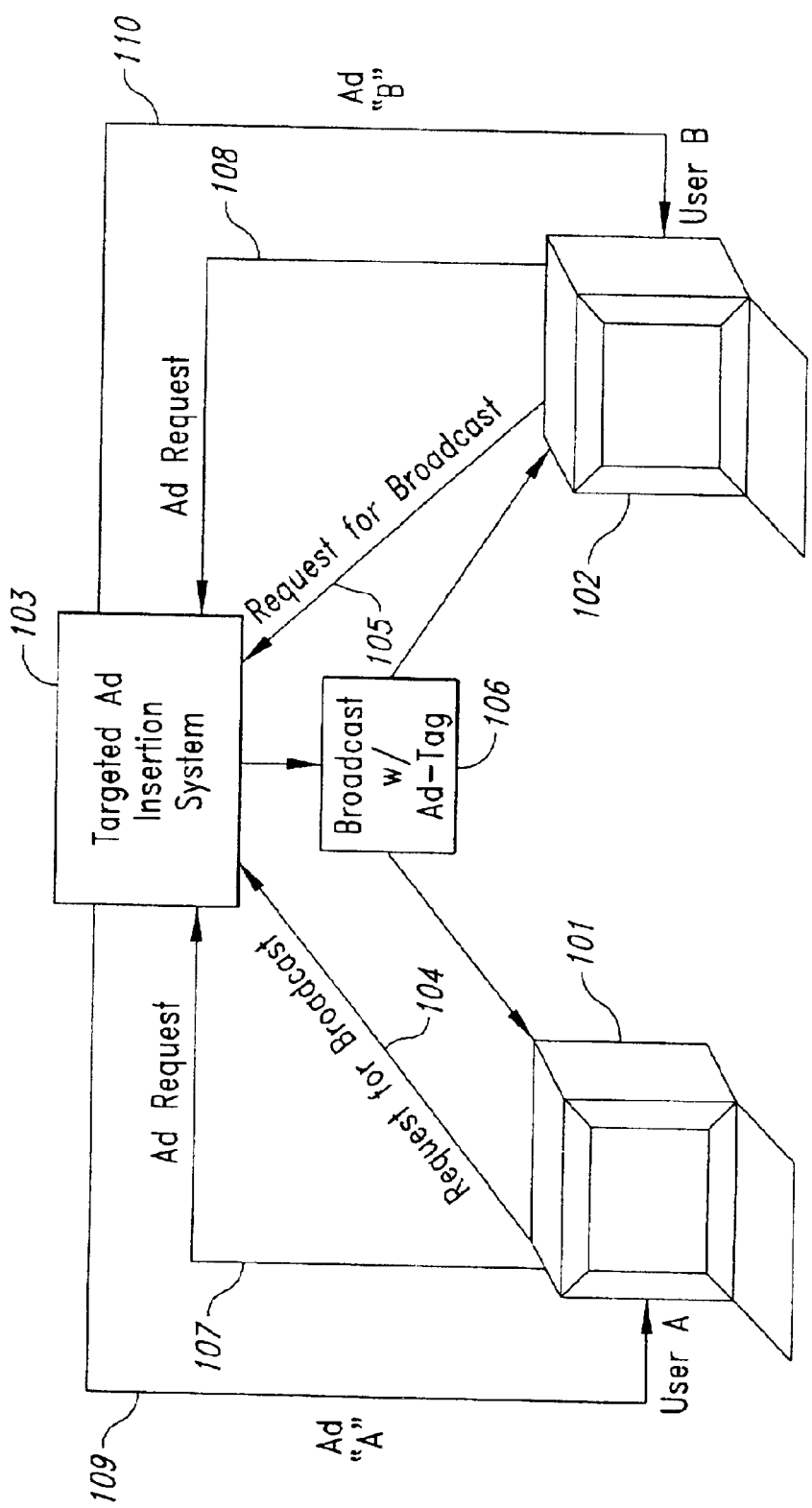
FIG. 1 is an illustration of an example use of the Targeted Ad Insertion System of the present invention.

FIG. 1 is an illustration of an example use of the Targeted Ad Insertion System of the present invention. A user "A" computer system 101 and a user "B" computer system 102 each submit a request for a broadcast 104 and 105, respectively. The Targeted Ad Insertion System ("TAIS") 103, transmits the requested broadcast stream 106, which has been encoded with "ad tags" to both user "A" 101 and user "B" 102. The ad tags indicate the starting point of original broadcast advertisements within the broadcast stream. When the media player used by user "A" detects an ad tag, the user "A" system generates and submits an ad request 107. In response to the ad request 107, the TAIS 103 automatically determines and transmits ad "A" 109 to user "A" 101. When the media player used by user "B" encounters an ad tag, the user "B" system generates and submits an ad request 108. In response to the ad request 108, the TAIS 103 automatically determines and transmits ad "B" 110 to user "B" 102. Ad "A" 109 and ad "B" 110 are preferably different advertisements, dynamically selected for each respective user by the TAIS. The dynamic ad selection may be based on any combination of a plurality of user profile data. The dynamic selection may be based on the requesting user's IP address, the type of media player submitting the request, geographic data associated with the user, demographic data associated with the user, or any other user profiling data. The respective media player within each user's system plays the broadcast stream until an ad tag is encountered. It then plays the received ad (ad "A" or ad "B" in this example) instead of playing the ad that follows the ad tag in the broadcast stream. After playing the received ad, the media player switches back to playing the broadcast stream.

In one embodiment of the invention, ads are dynamically inserted into streaming content that is pre-stored and then transmitted on demand. In another embodiment of the invention, ads are dynamically inserted into live streaming content, for example, a live radio broadcast. In one embodiment, the streaming content contains default ads that may be replaced with dynamically inserted ads. In another embodiment, the steaming content does not contain default ads, but contains encoded insertion indicators that indicate where ads are to be dynamically inserted. In yet another embodiment, the ads chosen for dynamic insertion are chosen according to user profile data.

Figure 2:
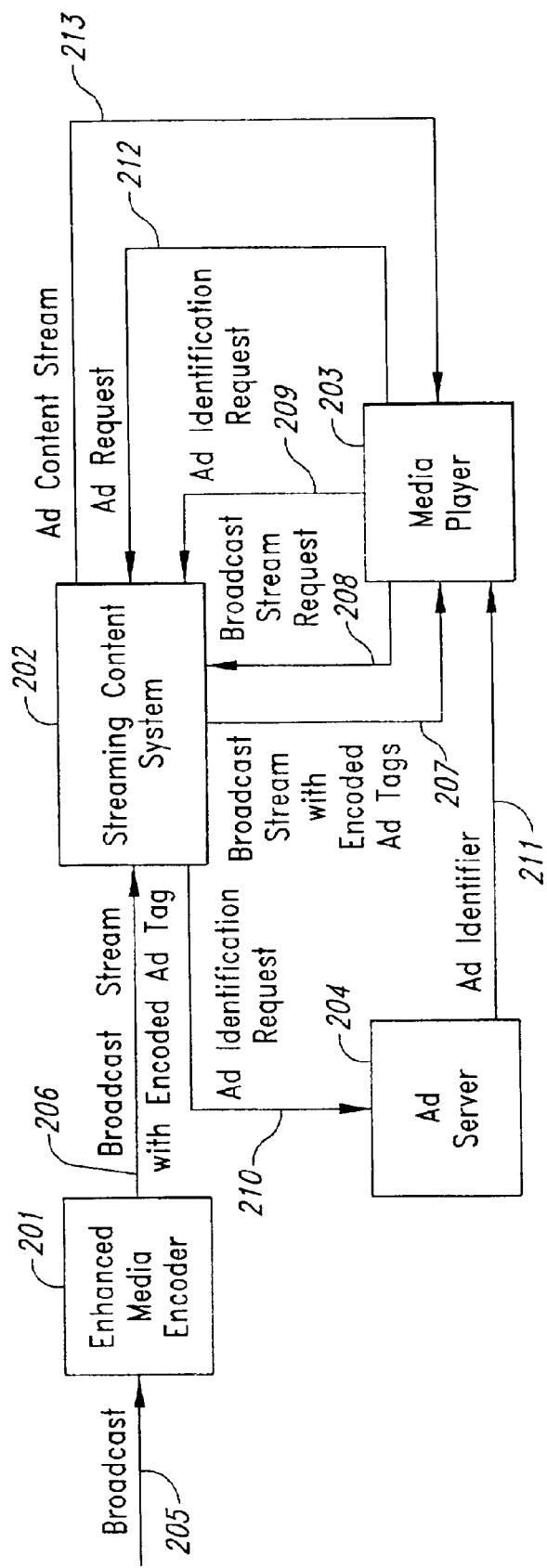
FIG. 2 is an example block diagram illustrating the data flow between the components of an example embodiment of a Targeted Ad Insertion System.

FIG. 2 is an example block diagram illustrating the data flow between the components of an example embodiment of a Targeted Ad Insertion System. A broadcast stream 205, generated for example by a radio station, is passed through an Enhanced Media Encoder ("EME") 201. The EME 201 encodes the broadcast stream for delivery over the Internet, adding event tags and ad tags that indicate segments of the broadcast stream that may contain advertisements. The encoded broadcast stream 206 is passed to the Streaming Content System ("SCS") 202. A media player 203 submits a broadcast stream request 208 to the SCS 202, requesting that the broadcast stream be transmitted to the media player 203. In response to the request, the SCS 202 transmits the encoded broadcast stream 207 to the media player 203. When the media player 203 detects an event tag indicating an upcoming advertisement block within the broadcast stream, the media player 203 submits an ad identification request 209 to the SCS 202. The SCS 202 forwards the ad identification request 210 to an Ad Server 204. The Ad Server 204 acts as a catalog of available advertisements. The Ad Server 204 determines an appropriate advertisement and sends an ad identifier 211 to the media player 203. The media player 203 then generates and transmits an ad request 212 to the SCS 202. The SCS 202 then sends the ad content stream 213 associated with the requested ad to the media player 203. The media player plays the requested broadcast stream until an ad tag is detected, at which time it switches over and plays the requested ad before switching back to playing the broadcast stream.

Figure 9:
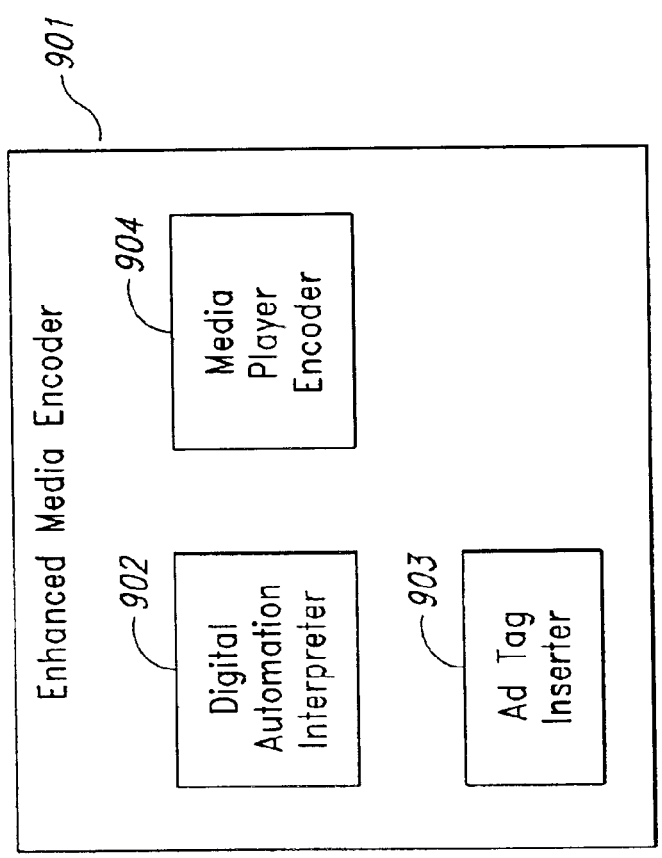
FIG. 9 is an example block diagram of an Enhanced Media Encoder of a Targeted Ad Insertion System of the present invention.

FIG. 9 is an example block diagram of an Enhanced Media Encoder of a Targeted Ad Insertion System of the present invention. The Enhanced Media Encoder 901 preferably resides at the broadcaster (e.g., radio or television station), and encodes the broadcast stream for transmission over the Internet. The Enhanced Media Encoder 901 comprises a Digital Automation Interpreter 902, an Ad Tag Inserter 903, and a Media Player Encoder 904. Using a radio station as an example broadcaster, the content for a broadcast stream (the music, DJ talk, advertisements, etc.) is generated through a sound board. Many radio stations also generate a data log through a digital automation system. The log generated by the digital automation system represents a structured schedule that dictates the format of the generated broadcast content. Because most radio stations use live DJs, the schedule indicated by the log is not specific, and allows for some slip in the schedule. For example, the log may specify that between 7:00 am and 7:03 am, a 60-second block of advertisements is to be played. The Digital Automation Interpreter 902 of the Enhanced Media Encoder 901 interprets the data automation system log and inserts Open__event tags and close__event tags into the broadcast stream to indicate where advertisement blocks are to occur. For example, for the log described above, an open__event tag would be inserted into the broadcast stream at 7:00 am and a close__event tag would be inserted into the broadcast stream at 7:03 am. The broadcast stream generated by the sound board may include advertisements. It is standard in the industry to insert a sub-audible tone into the broadcast stream prior to inserting an advertisement. Each radio station may insert the tone a set number of seconds, for example, 7 seconds, prior to each advertisement. The time between the ad tone and the beginning of the ad is configurable and may vary from one station to the next, but is consistent for all ads inserted at a given station. The Ad Tag Inserter 903 of the Enhanced Media Encoder 901 receives the broadcast stream from the sound board, and inserts an open__ad tag into the broadcast stream each time it detects a tone indicating an upcoming advertisement. The broadcast stream with open__event, close__event, and open__ad tags inserted is then passed through the media player encoder 904. The media player encoder 904 is an encoder specific to a particular media player available to an end user, and it performs additional encoding of the broadcast stream that transforms the stream into a format that can be interpreted by that media player.

The encoding process is altered slightly for broadcast streams generated from stations that do not utilize a digital automation system. Because the digital automation system generates the data that indicates where open_event and close_event tags are to be inserted in the broadcast stream, encoded streams from stations without digital automation systems do not have open_event and close_event tags inserted. This results in a greater risk of dead air time when dynamically inserting ads based on the detection of the open_ad tags (which are still inserted by the enhanced media encoder upon detection of the ad tones).

Figure 10:
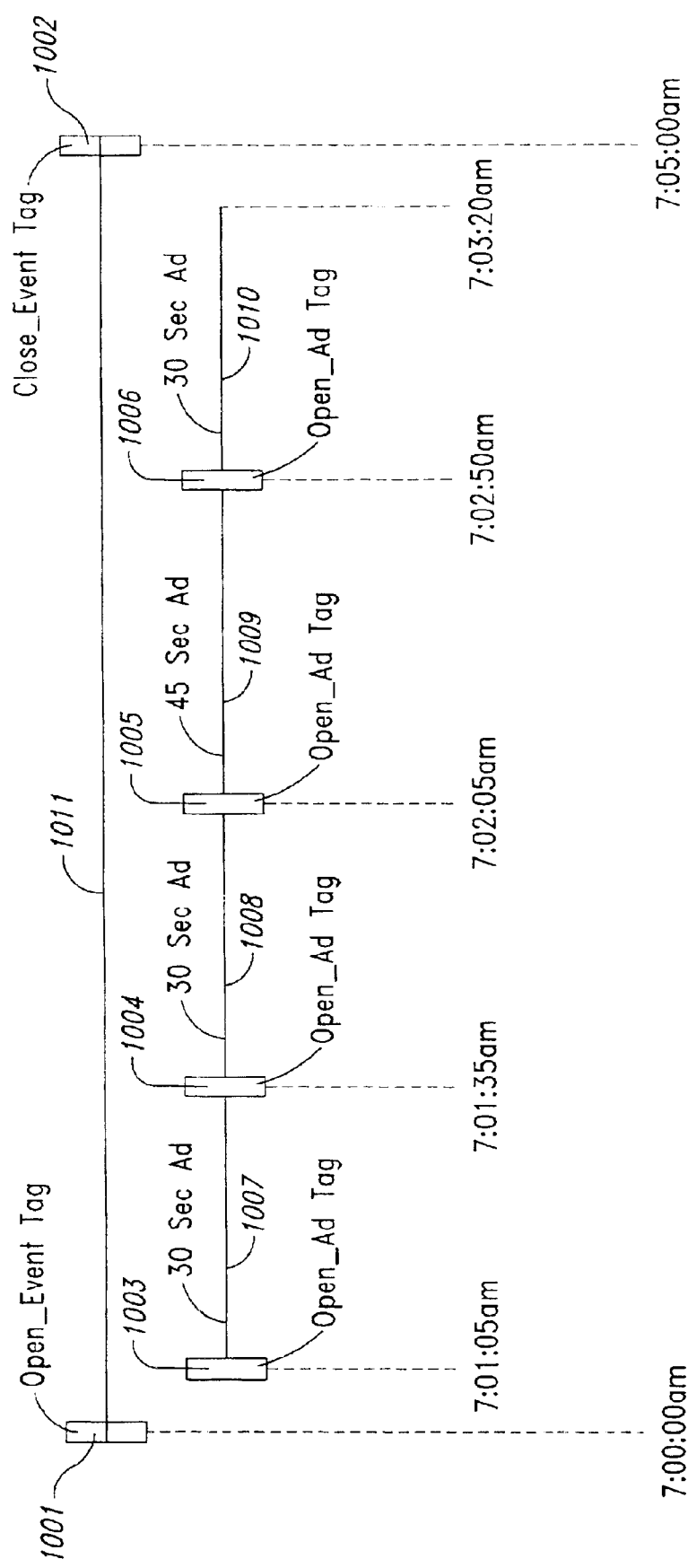
FIG. 10 is an example timeline illustrating an ad block within a broadcast stream.

FIG. 10 is an example timeline illustrating an ad block within a broadcast stream. The beginning of the ad block is indicated by the open_event tag 1001 that is inserted into the broadcast stream at 7:00:00 am. The end of the ad block is indicated by the close_event tag 1002 that is inserted into the broadcast stream at 7:05:00 am. The ad block in this example consists of four ads, three 30-second ads and one 45-second ad. The four open_ad tags 1003–1006 are inserted into the broadcast stream at the actual start point of each ad (in this example at 7:01:05 am, 7:01:35 am, 7:02:05 am, and 7:02:35 am). The last ad ends at 7:03:05 am, which is the time at which the media player will switch from playing the inserted ads back to playing the streaming broadcast.

Figure 3:
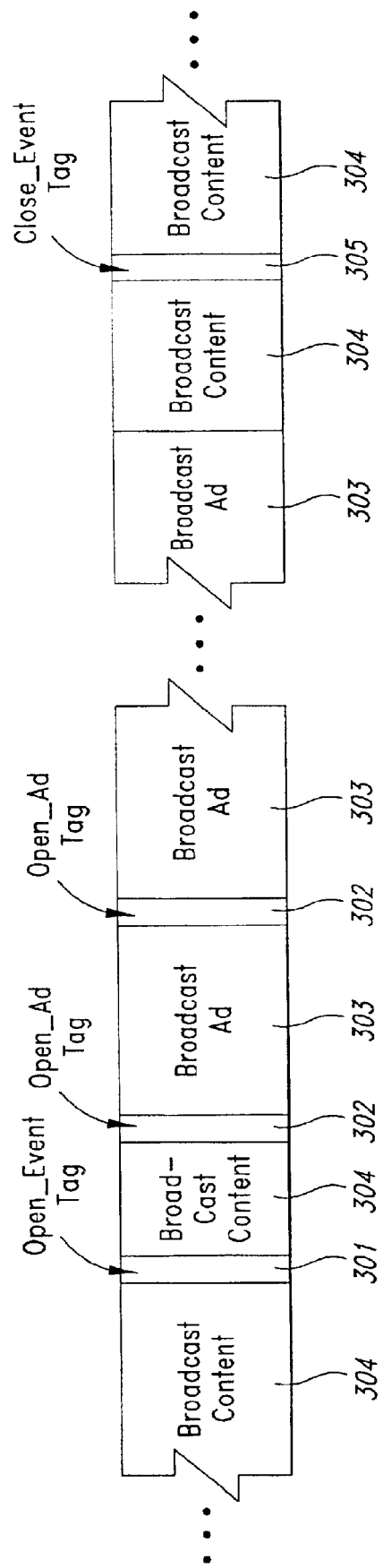
FIG. 3 is an example representation of a portion of an encoded broadcast stream.

FIG. 3 is an example representation of a portion of an encoded broadcast stream. The broadcast content 304 has one or more advertisement blocks within it. An advertisement block may comprise one or more individual ad spots 303. The beginning of an advertisement block is marked with an open_event tag 301. The end of an advertisement block is marked with a close_event tag 305. The beginning of each individual ad within the advertisement block is marked with an open ad_tag 302.

Figure 4:
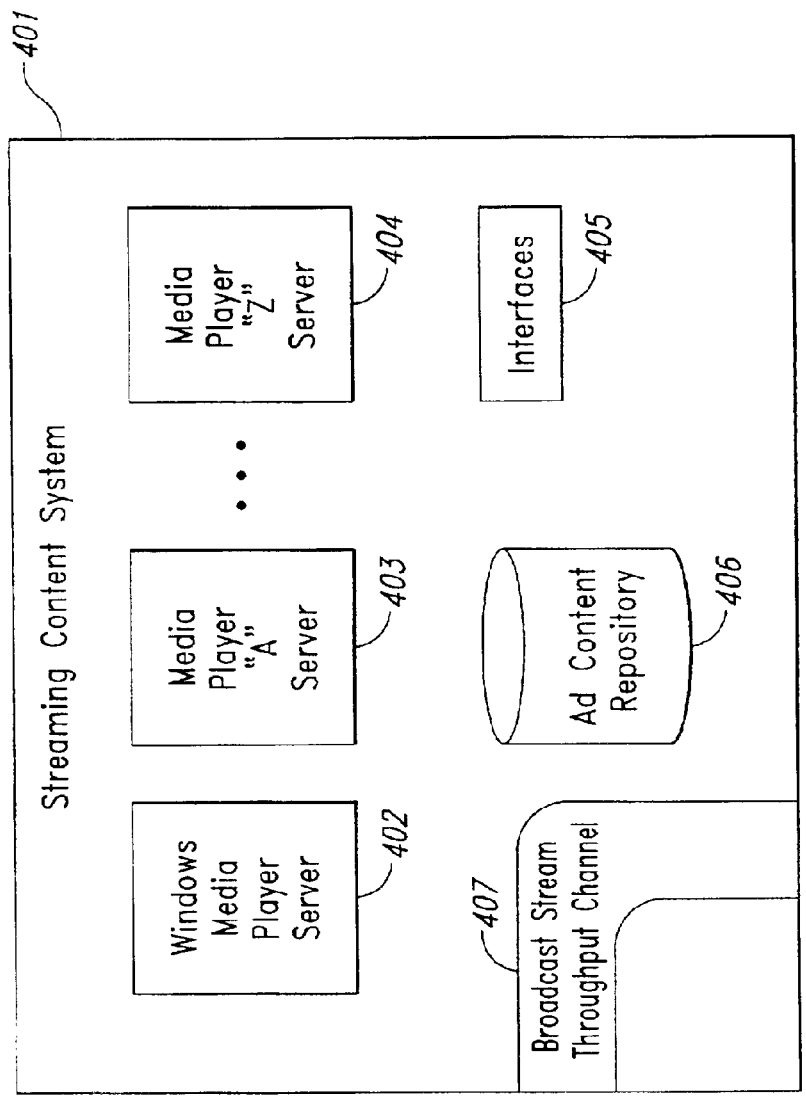
FIG. 4 is an example block diagram of a Streaming Content System of a Targeted Ad Insertion System.

FIG. 4 is an example block diagram of a Streaming Content System of a Targeted Ad Insertion System. The Streaming Content System 401 comprises one or more media player servers 402–404, interfaces 405, an ad content repository 406, and a broadcast stream throughput channel 407. Each media player server 402–404 provides an interface to its associated media player. For example, a Windows Media Player Server 402 provides an interface for serving broadcast streams to Windows Media Players, a Media Player "A" Server 403 provides an interface for serving broadcast streams to instances of a Media Player "A", and similarly, a Media Player "Z" Server 404 provides an interface for serving broadcast streams to instances of a Media Player "Z".

Figure 5:
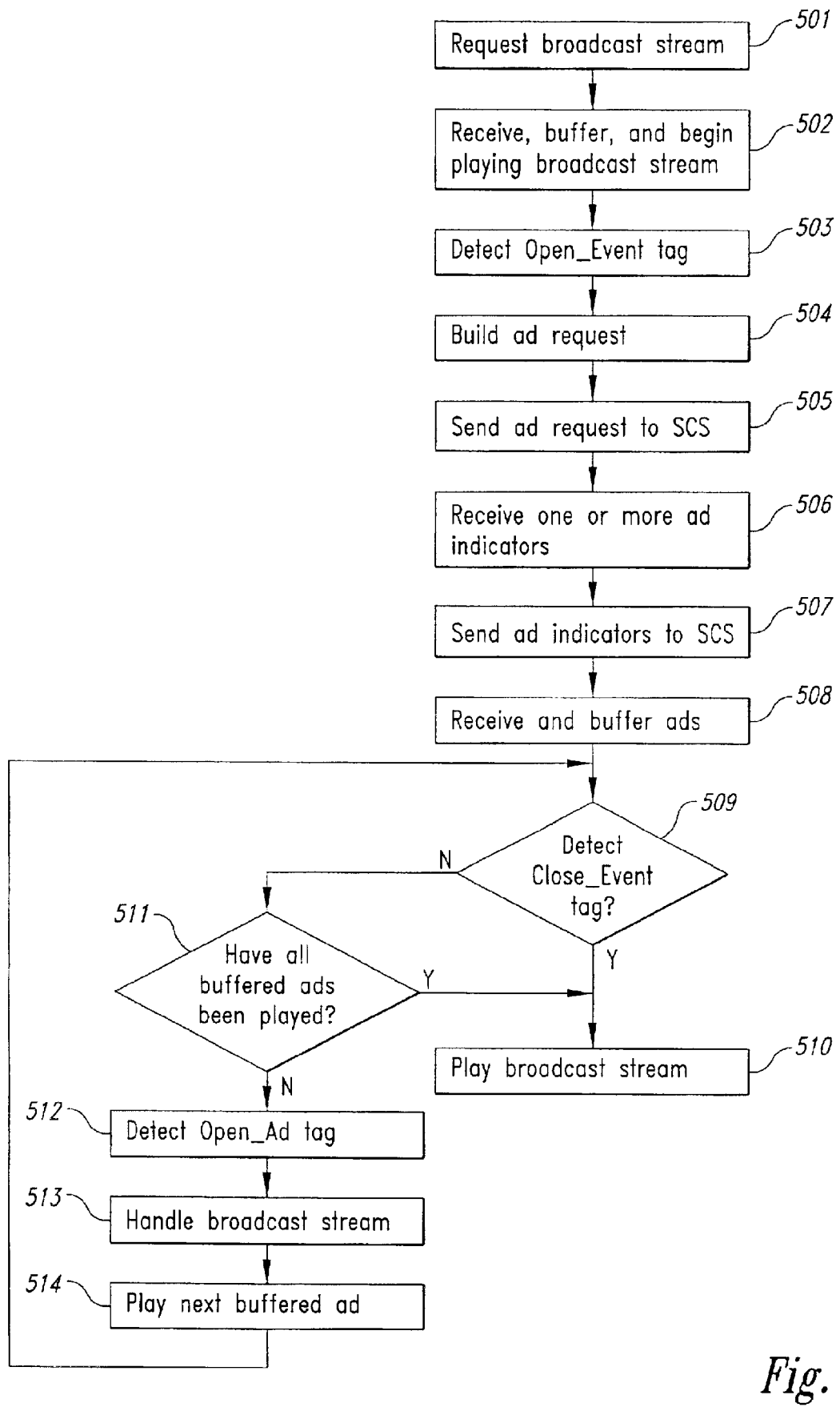
FIG. 5 is a flow chart of the steps performed by an example media player within a Targeted Ad Insertion System of the present invention.

FIG. 5 is a flow chart of the steps performed by an example media player within a Targeted Ad Insertion System of the present invention. In step 501, the media player requests a broadcast stream. In step 502, the media player receives, buffers, and begins playing the requested broadcast stream. In step 503, the media player detects an open_event tag. In step 504, the media player builds an ad request. In step 505, the media player sends the ad request to the SCS. In step 506, the media player receives one or more ad indicators identifying specific advertisements. In step 507, the media player sends a request to the SCS for the specific advertisements indicated in step 506. In step 508, the media player begins receiving and buffering the content streams of the requested ads. In step 509, if the media player detects a close_event tag, the media player continues playing the broadcast stream in step 510. If, in step 509, the media player does not detect a close_event tag, the media player continues in step 511. In step 511, the media player determines whether or not all of the requested ads for the ad block have been played. If all of the ads have been played, the media player resumes playing the broadcast stream in step 510, ignoring any remaining open_ad tags within the ad block defined by the open_event and close_event tags. If all of the ads have not been played, in step 512, the media player detects an open_ad tag. In step 513, the media player handles the broadcast stream. In step 514, the media player plays the currently buffered advertisement. The media player then continues at step 509, looping through the steps until either a close_event tag is detected, or all buffered ads have been played.

In step 513, there are several ways in which the media player can handle a broadcast stream. In one embodiment, the broadcast stream is played by one instance of a media player and the ad stream is played by a second instance of the media player. In this embodiment, the system handles the broadcast stream moving the broadcast stream media player to the background and moving the ad stream media player to the foreground. In another embodiment, the media player stops playing the broadcast stream, and switches over to playing the buffered ad. In yet another embodiment, the media player mutes the broadcast stream, and adjusts the volume of the ad stream to an audible level. Additional methods of handling the broadcast stream that allow the media player to play the advertisement stream are contemplated and are intended to fall within the scope of the invention.

If the media player detects a close_event tag prior to playing all of the ads that were identified to the media player by the ad server, the media player writes data to a log indicating that not all of the downloaded ads were played. Because most advertising spots are sold to advertisers, the ad server performs an additional function of tracking the downloaded advertisements for billing purposes. The ad server logs a billing entry in a log when an advertisement is identified to a media player. If the media player then encounters a close_event tag prior to playing the identified ad, the media player preferably writes an entry to the billing log indicating that although the ad was identified as an ad to be played, the ad was, in fact not played, and therefore the advertiser should not be billed for the advertisement spot.

FIG. 6A is example ASX script code indicating an ad block and an ad stream source.

FIG. 6B is example ASX script code indicating three ad blocks. The 60-second ad block event 6B01 comprises an open_event tag 6B03 and a close_event tag 6B04. Within the event tags, are specific entries 6B05 for requesting 30-second ads. A 90-second ad block event 6B02 is also shown.

Appendix C illustrates example formats for tags that may be inserted into broadcast streams and also sample formats for requests and responses to requests that occur between various components of the system. Appendix C is hereby incorporated by reference in its entirety.

The TAIS dynamically determines which ads to insert into the broadcast stream in response to each request for an ad stream. In one embodiment of the invention, the media player gathers and stores data that characterizes the user. This user characterization data may be passed to the SCS and forwarded on to the ad server as part of the ad identification request. The ad server uses the received user characterization data to determine an appropriate ad to be inserted in to the broadcast steam. The user characterization data may include a variety of data, for example, an indicator of the type of media player, the user's age, the user's gender, an indication of the user's hobbies, and/or an indication of broadcast content genre typically requested by the user (e.g., country music or talk radio). One skilled in the art will recognize that a variety of data could be used to characterize a user, and that a variety of techniques could be used to interpret that data and determine from it an appropriate ad or set of ads to send to the user.

Figure 7:
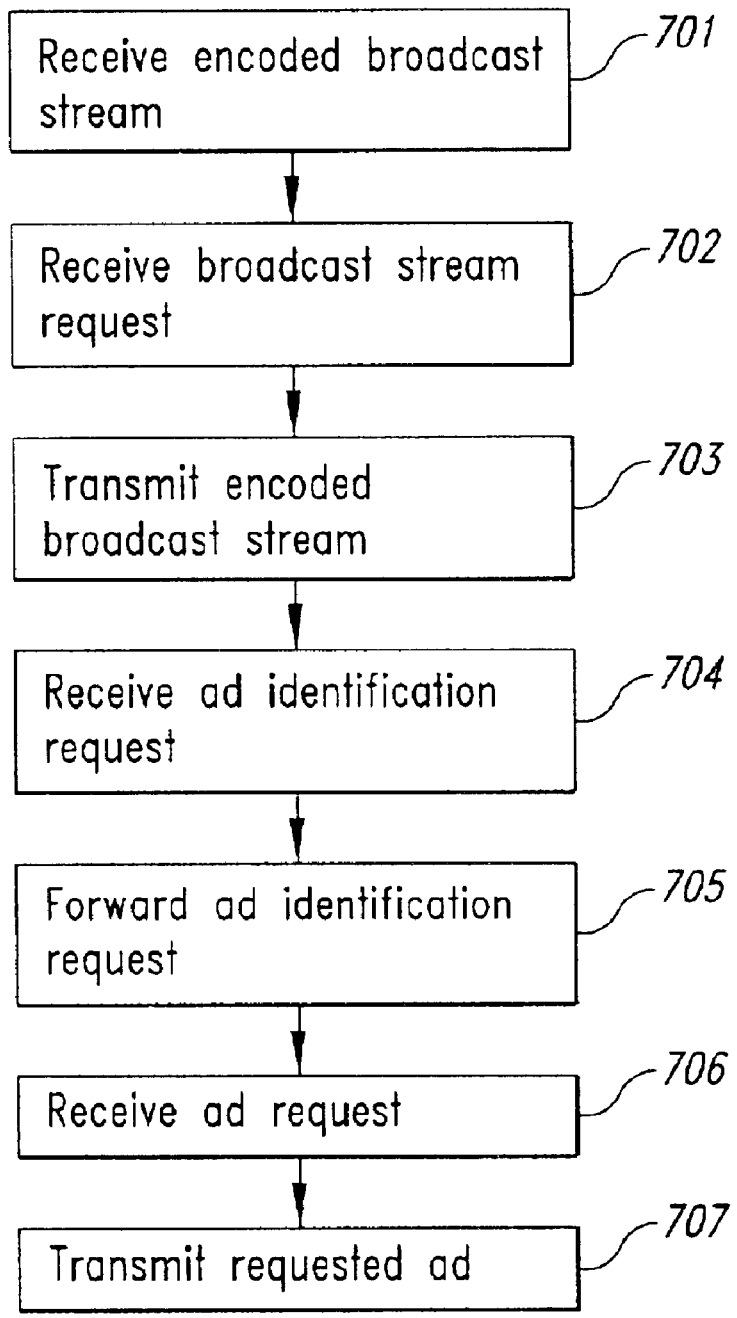
FIG. 7 is a flow chart of the steps performed by an example Streaming Content System within a Targeted Ad Insertion System of the present invention.

FIG. 7 is a flow chart of the steps performed by an example Streaming Content System within a Targeted Ad Insertion System of the present invention. In step 701, the SCS recieves an encoded broadcast stream from a broadcaster. In step 702, the SCS receives a request from a media player for the broadcast stream. In step 703, the SCS transmits the encoded broadcast system to the requesting media player. In step 704, the SCS receives a request for an ad identification, for example from a media player. In step 705, the SCS forwards the ad identification request to an ad server. In step 706, the SCS receives a request from a media player for streaming ad content. In step 707, the SCS transmits the requested streaming ad content to the requesting media player.

FIGS. 5 and 7 describe the steps performed by the media player and the SCS, respectively, in one example embodiment of the TAIS. In the described embodiment, the media player drives the flow of data between the components of the system, and is the component that detects the inserted event tags and in response, makes ad requests, and determines what content stream to play at any given instance. In an alternate embodiment of the TAIS, the SCS drives the flow of data between the system components. In such a system, the SCS detects the inserted event tags while streaming the content to the media player. When the SCS detects an open_event tag, the SCS requests that the ad server determine appropriate ads to buffer. When the SCS detects an open_ad tag, the SCS implements one of a plurality of techniques to stream buffered ad content to the media player instead of streaming the portion of the broadcast stream within the indicated ad block (which may include original broadcast advertisements) to the media player. Other configurations of the TAIS where other system components drive the data flow are contemplated and are intended to fall within the scope of the present invention. In addition, it is contemplated that the communication and data flow between the components of the TAIS may vary without affecting the scope of the invention. For example, the media player may make ad requests directly to an ad server instead of submitting requests through the SCS. Also, the ad server may send indicators of determined ads to the SCS instead of directly to the media player. One skilled in the art will recognize that various configurations are possible that will result in the same functionality. These variations are contemplated and are intended to fall within the scope of the invention.

Figure 8:
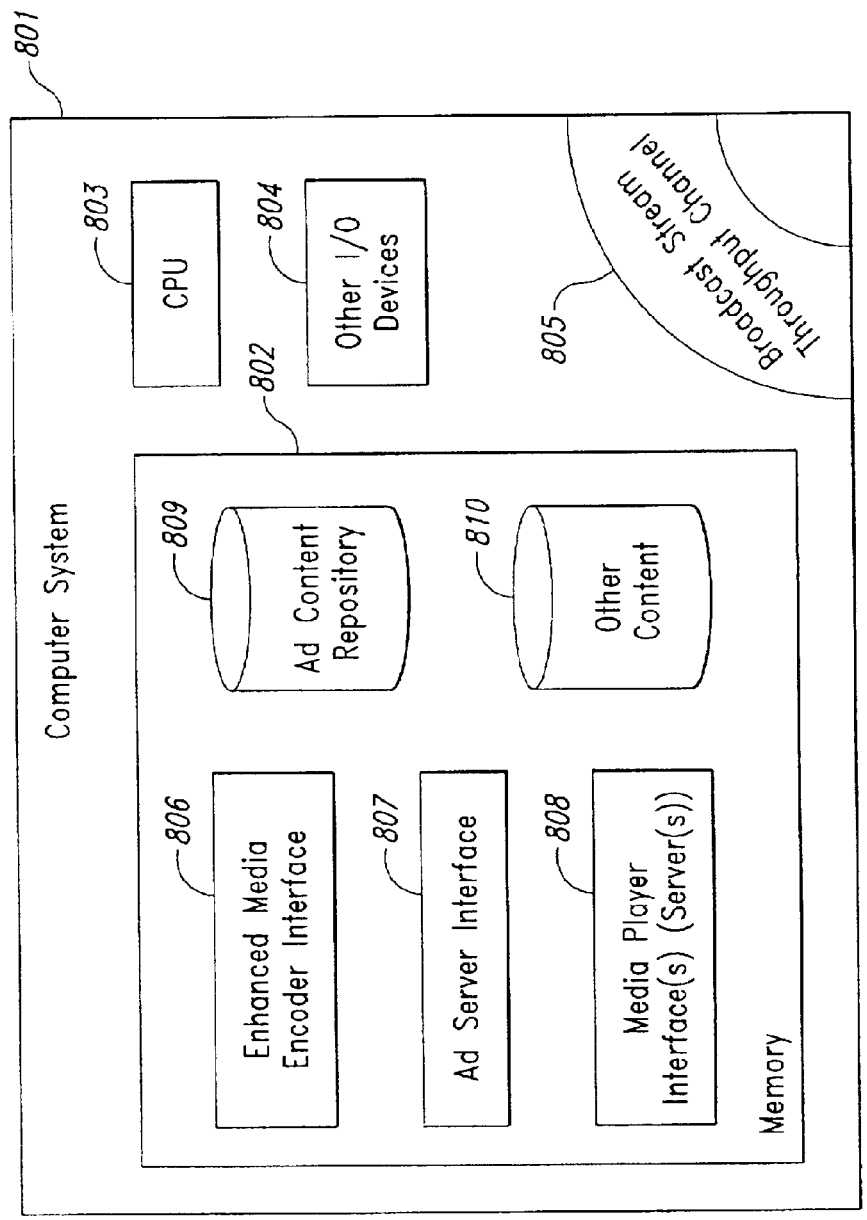
FIG. 8 is an example block diagram of a Streaming Content System residing in a computer system for practicing embodiments of the present invention.

FIG. 8 is an example block diagram of a Streaming Content System residing in a computer system for practicing embodiments of the present invention. The computer system 801 comprises a CPU 803, a memory 802, a Broadcast Stream Throughput Channel 805, and other I/O devices 804. Components that may reside in the computer system memory 802 comprise an Enhanced Media Encoder Interface 806, an Ad Server Interface 807, one or more Media Player Interfaces (or servers) 808, an Ad Content Repository 809, and other media content 810. This figure illustrates how one component of the TAIS (i.e., the SCS) may be implemented within a computer system. Other components of the TAIS (e.g., the ad server, the media player, and the enhanced media encoder) may also be implemented within one or more computer systems that may be remotely located in relation to each other. In addition, each component of the TAIS may comprise components that may be distributed across multiple computer systems.

One skilled in the art will recognize that exemplary Targeted Ad Insertion Systems can be implemented as one or more code modules and may be implemented in a distributed environment where the various components of the TAIS may be distributed among several computer systems. In addition, each component of the TAIS (e.g., the SCS) may comprise multiple components (e.g., the SCS components shown in FIG. 8 as residing in the memory 802) that may be distributed among several computer systems. In addition, the computer system may itself be distributed. For example, referring to FIG. 8, the ad content repository 809 may reside on a server computer system and execute separately from the other SCS components. In addition, the ad content repository may be distributed across several computer systems and different types of memories. Other variations and configurations are also contemplated.

Specifications for one example embodiment of the TAIS in a Windows environment are described in detail in appendices A and B, which are hereby incorporated by reference in their entirety. In a Windows environment, the Windows Media Player is used to interface with the SCS and play the streamed media content. When a user requests streaming media, a first Windows Media Player is instantiated and begins receiving, buffering, and playing the requested media stream. When the first Media Player detects an open_event tag, a second Windows Media Player is instantiated. The second Windows Media Player generates the ad identification request and submits the request to the SCS. When the second Windows Media Player receives the ad identification (s), it generates a request to begin buffering the identified ad(s). The SCS transmits the requested ads to the second Windows Media Player. When the first Windows Media Player (which is playing the requested broadcast stream) detects an open_ad tag, the user computer system adjusts the volume of the first Windows Media Player to effectively mute the broadcast stream and adjusts the volume of the second Windows Media Player to an audible level. This volume adjustment effectively switches the stream that is being played from the broadcast stream to the ad stream. When all of the buffered ads have been played or when the first Windows Media Player detects a close_event tag, the volume adjustment is reversed, effectively switching the stream that is being played from the ad stream back to the broadcast stream.

The implementation of the TAIS system in a Windows NT system varies in that Windows NT does not support multiple, simultaneous instantiations of the Windows Media Player. Because of this limitation, one instance of the Windows Media Player is used to stream both the broadcast stream and the ad stream. When the Windows Media Player detects an open_event tag while playing the broadcast stream, it generates the ad requests as defined above, and begins buffering the received ads. When the Windows Media Player detects an open_ad tag, the Windows Media Player stops playing the broadcast stream and begins playing the buffered ad stream. Based on the known length of the ad block, the Windows Media Player begins buffering the broadcast stream when it determines that it is nearing the end of the ad block. When the Windows Media Player detects that the last buffered ad has been played or when the Windows Media Player detects a close_event tag, the Windows Media Player stops playing the ad stream and begins playing the broadcast stream. In this implementation, it is difficult to eliminate all dead air time after playing the ad stream because it is difficult to determine that amount of time that is required to fully buffer the broadcast stream.

Implementations using media players other than the Windows Media Player are contemplated. For example, a media player may be implemented that has multiple channels, allowing multiple streams to be buffered simultaneously. Alternately, a media player may have dedicated media and data channels, allowing the media player to make data requests without disrupting the transfer of streaming media.

In an alternate embodiment of the present invention, selective ad replacement is contemplated. In this embodiment, an ad block may comprise, for example, four 30-second ads. Implemented with the concept of selective ad replacement, the TAIS may dynamically replace only a subset of the broadcast ads within a block. For example, the TAIS may replace the first or last ad of every ad block, or it may replace the first 30second ad within each ad block. One skilled in the art will recognize that selective ad replacement may be highly customizeable, and any selection process may be used to determine which ads to replace and which ads to broadcast in their original form.

In one embodiment, the TAIS may replace each original ad with a dynamically selected ad of the same length. For example, an ad block comprising three 30-second ads followed by a 45-second ad would be replaced by three 30-second ads followed by a 45-second ad, all dynamically selected. In an alternate embodiment, the TAIS may insert dynamically selected ads based only on the total duration of the ad block. For example, an ad block comprising three 30-second ads followed by a 45-second ad may be replaced by one 60-second ad, one 45-second ad, and one 30-second ad, all dynamically selected.

It is contemplated that interactive ads may also be dynamically inserted into a broadcast stream. For example, an ad may comprise both audio and graphical data. The audio portion may be dynamically inserted into the broadcast stream, and while the audio ad is being played by the media player, an associated graphical ad portion may be displayed, for example in a browser window. The graphical data could be of a form similar to a banner ad that allows a user to select the ad, for example to display a website associated with the advertiser. Embodiments are contemplated that allow dynamic insertion of interactive ads within video streams as well.

Dynamic ad insertion is not limited to audio broadcast streams. Video broadcast stream ad insertion may be implemented in a similar fashion to that described above with reference to audio broadcast streams. In the Windows environment, however, the implementation described above that adjusts the volume of two instances of the Windows Media Player is not sufficient when streaming video data. Swapping between two video streams can be implemented with two instances of the Windows Media Player, as described above, but instead of adjusting the volume to switch steams, the Windows Media Player playing the ad stream is brought to the foreground and the Windows Media Player playing the broadcast stream is sent to the background. When the ad stream is done playing, the Windows Media Players are again swapped between the foreground and the background. Implementation of dynamic ad insertion in video broadcasts in a Windows NT environment is the same as that described above for audio broadcasts in the Windows NT environment.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to dynamically inserting any type of data into streaming media, not limited to audio and video, and also not limited to live broadcasts. These and other changes may be made to the invention in light of the above detailed description. Accordingly, the invention is not limited by the disclosure, but instead the scope of the present invention is to be determined by the following claims.

What is claimed is:

1. A method in a computer system for dynamically inserting a personalized advertisement into a digital broadcast stream, comprising;

forwarding a request to obtain the digital broadcast via a stream;

receiving and streaming the requested digital broadcast;

when detecting an open event in the stream, forwarding a request for an advertisement with an indication of personalization data;

receiving an indication of the advertisement that corresponds to the personalization data;

downloading the indicated advertisement; and when detecting an ad event during a playback of the digital broadcast stream, causing the playback to switch to the downloaded advertisement, wherein the computer system is configured to pre-store and transmit on demand the digital broadcast stream, wherein causing the playback to switch to the downloaded advertisement comprises turning down a volume of an instantiated media player streaming the digital broadcast stream advertisement while a separate instantiated media player streams the downloaded advertisement.

2. The method of claim 1, wherein the personalization data includes at least one of:

an IP address of a user of the computer;

a type of media player submitting the request;

geographic data associated with the user of the computer;

demographic data associated with the user; and other user profile data.

3. The method of claim 1, wherein the digital broadcast stream contains no default ads and contains encoded insertion markers that indicate the ad event.

4. The method of claim 1, further comprising switching the playback to play the digital broadcast stream upon detection that all buffered ads have been played.

5. The method of claim 1, further comprising switching the playback to play the digital broadcast stream upon detection of a close_event tag.

6. A targeted ad insertion system (TAIS) for dynamically inserting a personalized advertisement into a digital broadcast stream, comprising:

an enhanced media encoder for encoding a broadcast stream for delivery over a data network, wherein the encoder adds event tags and ad tags that indicate segments of the broadcast stream containing advertisements;

a streaming content system that receives the encoded broadcast stream from the enhanced media encoder; and a media player that requests the digital broadcast stream from the streaming content system, wherein the media player is configured to receive the personalized advertisement for playing within a prestored digital broadcast stream that is transmitted on demand, wherein the enhanced media encoder comprises;

a digital automation interpreter that interprets a data automation log and inserts the event tag into the broadcast stream;

an ad tag inserter that inserts ad tags into the broadcast stream when a tone indicating an upcoming advertisement is detected; and a media player encoder for formatting the broadcast stream into a format that can be interpreted by the media player.

7. The TAIS of claim 6, further comprising an ad sever that receives an ad identification request from the streaming content system and forwards an ad identifier to the media player.

8. The TAIS of claim 7, wherein the ad server chooses an ad to be inserted in the broadcast stream based on criteria comprising at least one of:

type of media player playing the broadcast stream;

age of a user of the media player;

gender of the user;

hobbies of the user; and usual genre of broadcast content requested by the user.

9. The TAIS of claim 7, wherein the streaming content system comprises:

an ad content repository containing ad content for streaming ads to be inserted in the digital broadcast stream; and a broadcast stream throughput channel for transmitting the broadcast stream and ad content to the media player.

10. The TAIS of claim 9, wherein the streaming content system further comprises:

one or more media player servers for providing an interface to the media player, such that a media player server is chosen to serve the broadcast stream to the media player based on a match between the media player and media player server.

11. The TAIS of claim 9, wherein the streaming content system further comprises:

a central processing unit running in a computer of the streaming content system;

an enhanced media encoder interface to receive content from the enhanced media encoder; and an ad server interface to forward ad identification requests to the ad server.

12. A method for providing to a requestor a digital broadcast stream that includes dynamically-inserted advertisement content personalized to the requestor, comprising:

receiving an encoded digital broadcast stream from a broadcaster;

receiving a request to transmit the broadcast stream from a media player of the requestor;

transmitting the encoded broadcast stream to the media player;

receiving an ad identification request from the media player;

forwarding the ad identification request to an ad server, wherein the ad server chooses an ad to be dynamically inserted based on personalized data associated with a media player user;

receiving an ad request linked to the ad identification request; and transmitting the requested ad to the media player in a format compatible with the media player, wherein the requested ad is dynamically inserted into a broadcast stream that is pre-stored and transmitted upon demand, wherein a volume of an instantiated media player streaming the digital broadcast stream is turned down while a separate instantiated media player streams the requested ad.

13. The method of claim 12, wherein the personalized data includes at least one of:

an IP address of a user of the computer;

a type of media player submitting the request;

geographic data associated with the user of the computer;

demographic data associated with the user; and other user profile data.

14. The method of claim 12, wherein the digital broadcast stream contains no default ads and contains encoded insertion markers that indicate the ad event.

15. The method of claim 12, further comprising switching playback to play the digital broadcast stream upon detection that the requested ad has been played.

16. The method of claim 12, further comprising switching playback to play the digital broadcast stream upon detection of a close_event tag.

* * * * *